No. 867,096. PATENTED SEPT. 24, 1907.
C. B. BENDLAGE.
HOE OR RAKE HANDLE CONNECTION.
APPLICATION FILED MAR. 21, 1907.
2 SHEETS—SHEET 1.
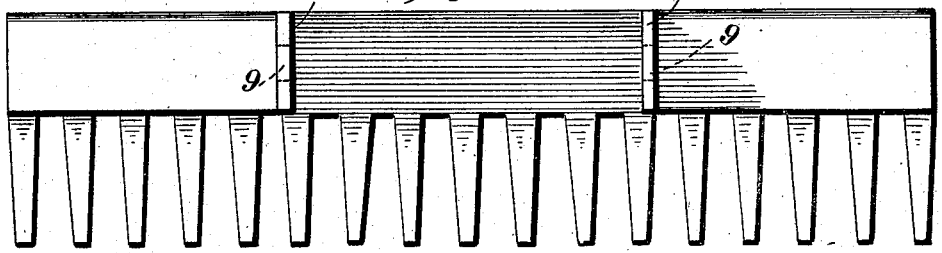
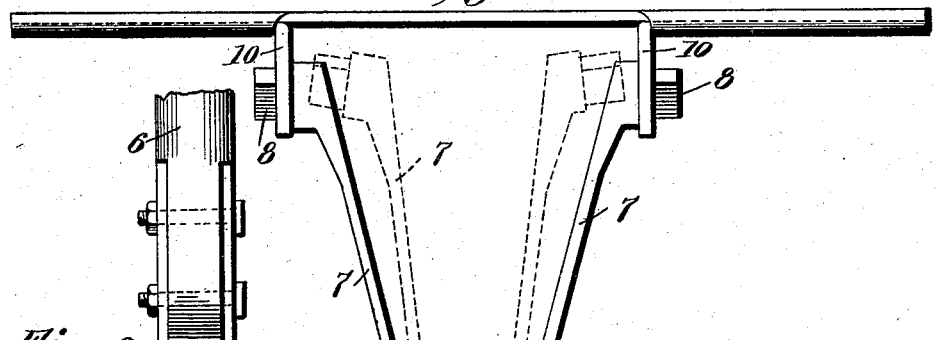
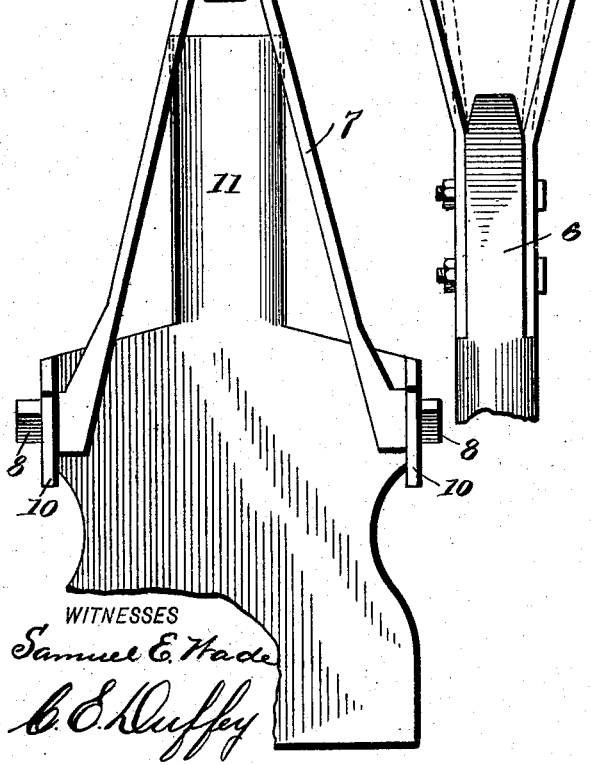
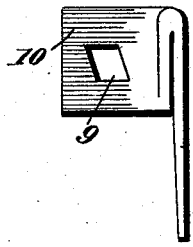
WITNESSES
Samuel E. Wade
C. E. Duffy
INVENTOR
CHARLES B. BENDLAGE
BY Munn & Co.
ATTORNEYS

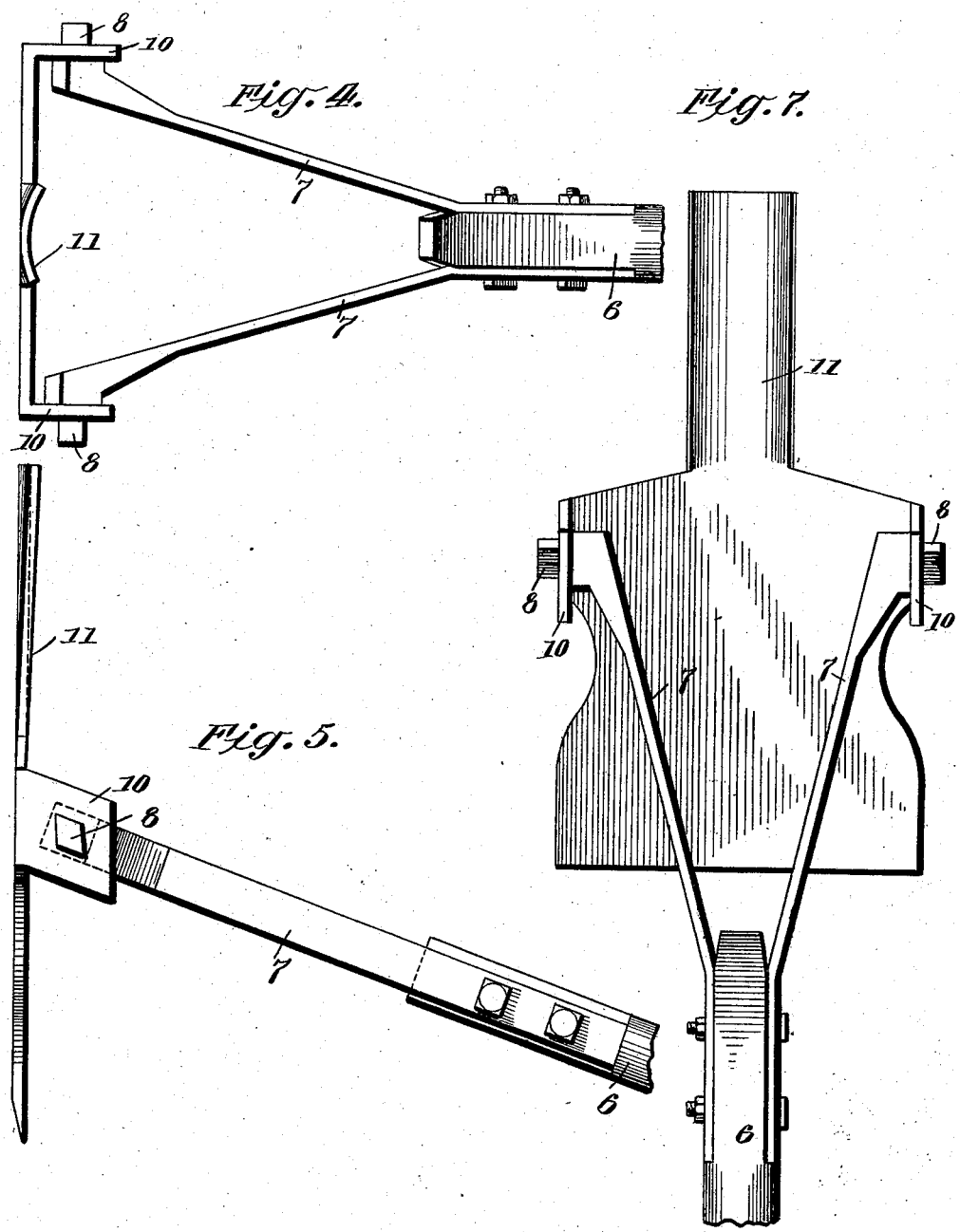

UNITED STATES PATENT OFFICE.

CHARLES B. BENDLAGE, OF MARSHALLTOWN, IOWA.

HOE OR RAKE HANDLE CONNECTION.

No. 867,096.  Specification of Letters Patent.  Patented Sept. 24, 1907.

Application filed March 21, 1907. Serial No. 363,650.

*To all whom it may concern:*

Be it known that I, CHARLES B. BENDLAGE, a citizen of the United States, residing at Marshalltown, in the county of Marshall and State of Iowa, have invented a new and useful Improvement in Hoe or Rake Handle Connections, of which the following is a specification.

This invention relates particularly to means for connecting and adjusting hoe or rake heads to the handles thereof, and has for its object to provide an interchangeable handle which may be applied to the heads of hoes, rakes or similar implements.

A further object of the invention is to provide a handle to which the head of the desired implement may be applied in various positions, according to the nature of the work to be done.

A further object is to dispense with the use of bolts or screws in connecting a handle to the implement head by the provision of spring arms secured to the handle and adapted to be quickly attached to or detached from the head.

The invention is illustrated in the accompanying drawings, in which

Figures 1 and 2 are side and end views of a rake head forming a part of the invention. Fig. 3 is a plan view of the rake head with the handle attached. Fig. 4 is a plan view of a hoe with handle attached. Fig. 5 is a side view thereof. Fig. 6 is a plan view of the hoe and handle adjusted for use as a scraper. Fig. 7 is a similar view of the same parts adjusted for use as a spud or dandelion digger.

Referring specifically to the drawings, 6 indicates a handle to the front end of which are bolted spring arms 7 having at their front or outer ends oppositely projecting lugs 8. These lugs are polygonal or non-circular in shape, and are formed to fit in corresponding holes 9 in ears 10 projecting from the implement head. The shape of the holes and lugs may be any symmetrical or regular polygon. I have shown them diamond-shaped, which permits suitable adjustments.

The rake head shown in Figs. 1, 2 and 3 is conveniently stamped or pressed of one piece of steel, the back being folded, cut and bent out to form the pair of ears 10, referred to. The hoe head shown in Fig. 4 *et seq.* has similar ears 10 struck up from the side edges thereof, and perforated to receive the lugs 8 on the ends of the spring arms. The spring arms 7 are rather stiff, so that they will not yield and allow the lugs 8 to slip out under ordinary strain but by special effort the arms may be pressed together and the lugs disengaged, allowing the handle to be changed from one tool to another of the same set. The regular polygonal shape of the lugs and holes allows the handle to be turned to different inclinations, since the lugs will fit in the holes in several different positions. Thus Fig. 5 shows the hoe head in position for use as a hoe; Fig. 6 in position for use as a scraper; and Fig. 7 in position for use as a dandelion digger, the spud 11, projecting from the back of the hoe blade, being in position to be pushed or driven into the ground to lift dandelion or similar roots.

The invention is not limited to the particular tools shown, not otherwise than as indicated in the following claims.

I claim

1. The combination with an implement head having a pair of perforated ears, of a handle having a pair of spring arms projecting between the ears and provided with lugs engageable in the perforations in the ears.

2. The combination with an implement head having a pair of projecting ears, of a handle having a pair of spring arms yieldingly engageable with the ears.

3. The combination with an implement head having a pair of projecting ears, of a handle having a pair of spring arms yieldingly engageable with the ears and adjustable to hold the handle at various angles with respect thereto.

4. The combination with an implement head having a pair of projecting ears with symmetrical non-circular holes therein, of a handle having a pair of arms with projecting lugs shaped to correspond with the holes and adapted to fit therein at various angles.

5. The combination with an implement head provided with spaced ears, of a handle having spring arms engaging the ears.

CHARLES B. BENDLAGE.

Witnesses:
C. H. CHEAVER,
W. R. CUNNINGHAM.